April 4, 1950     A. T. NABSTEDT ET AL     2,502,799
REVERSING GEAR
Filed March 15, 1947     6 Sheets-Sheet 1
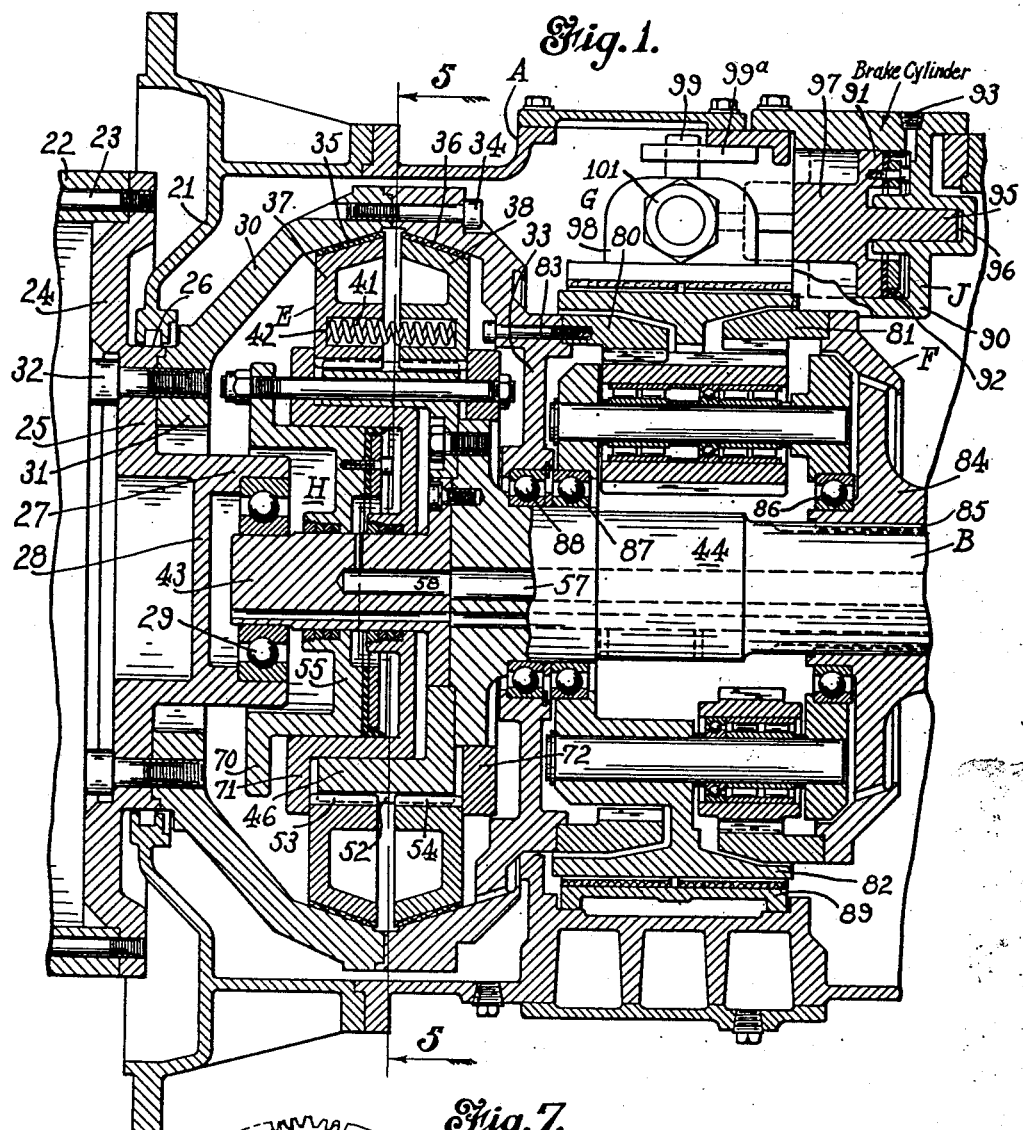

April 4, 1950     A. T. NABSTEDT ET AL     2,502,799
REVERSING GEAR
Filed March 15, 1947     6 Sheets-Sheet 2
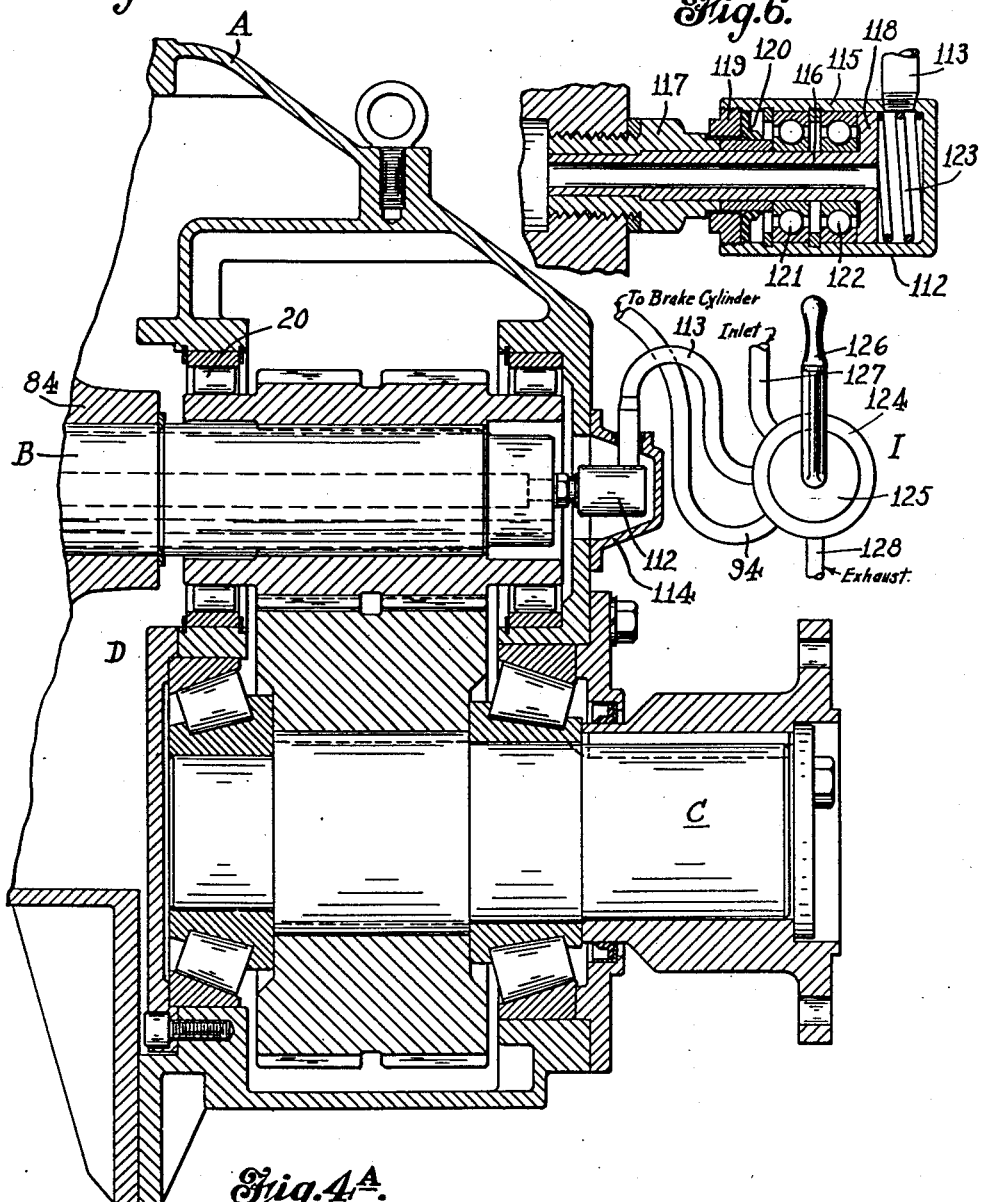
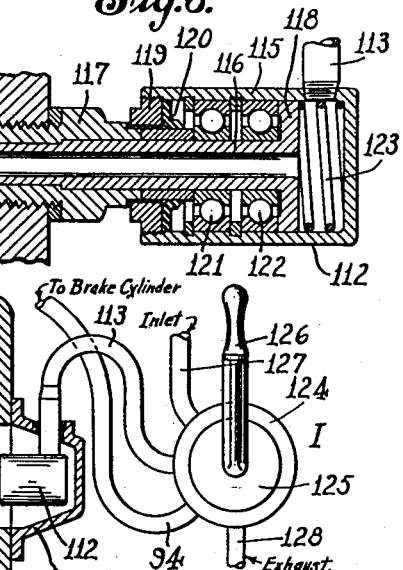
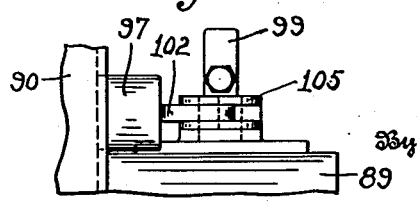

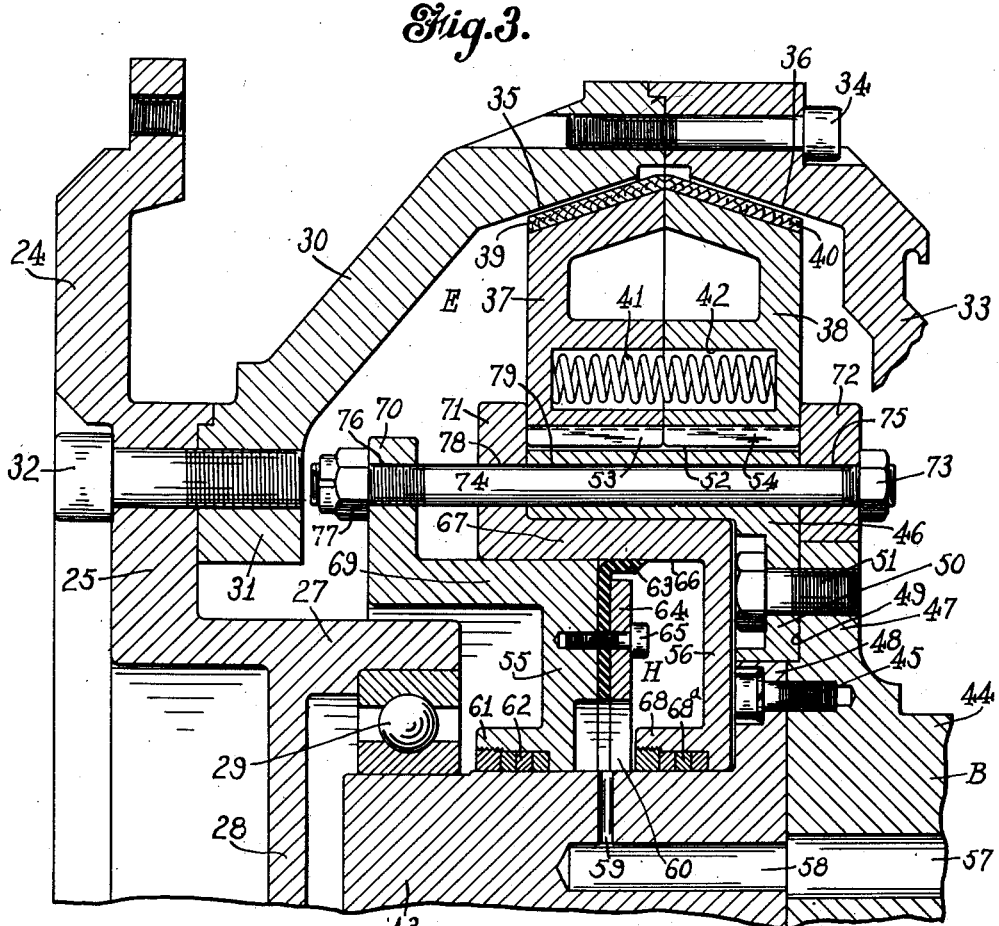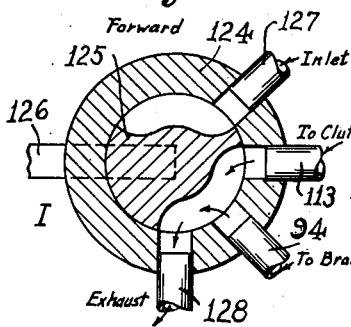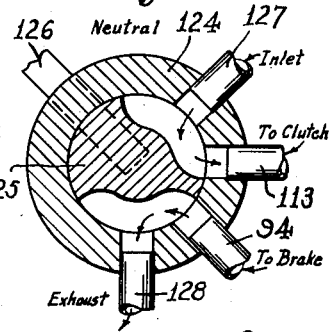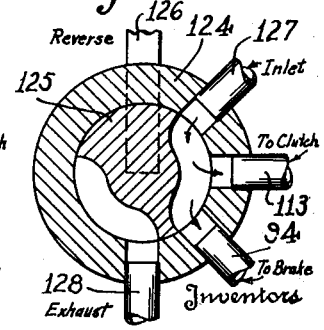

April 4, 1950     A. T. NABSTEDT ET AL     2,502,799
REVERSING GEAR
Filed March 15, 1947     6 Sheets—Sheet 4
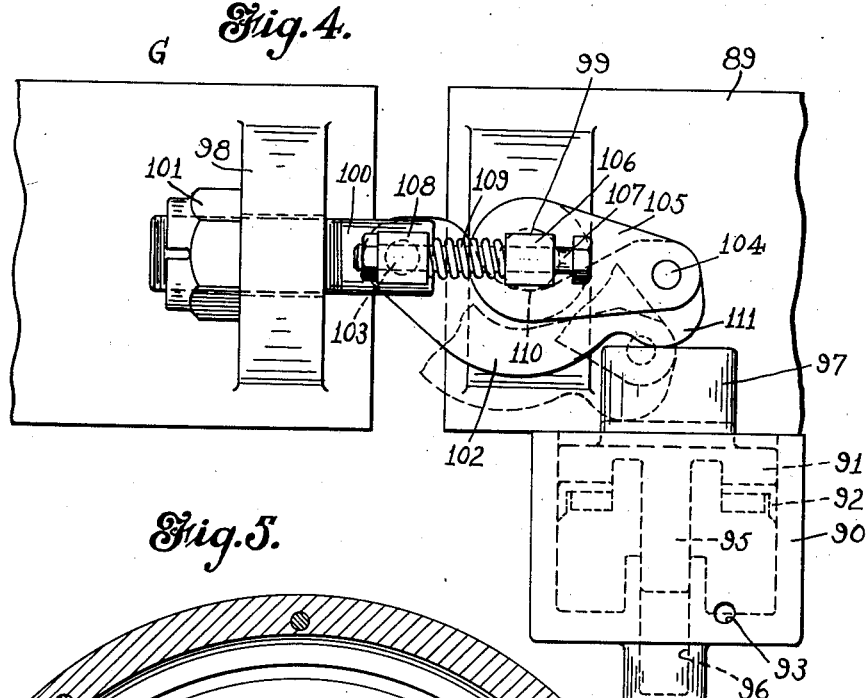
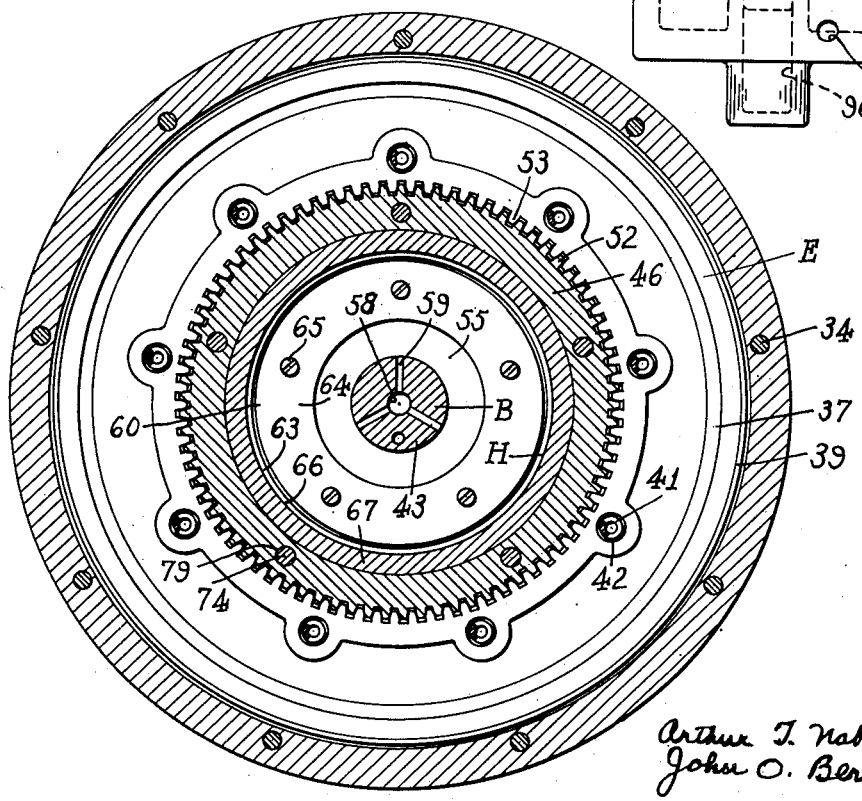

April 4, 1950 A. T. NABSTEDT ET AL 2,502,799
REVERSING GEAR
Filed March 15, 1947 6 Sheets-Sheet 5

Inventors
Arthur T. Nabstedt
John O. Berndtson
By Rockwell & Bartholow
Attorneys Patented Apr. 4, 1950

2,502,799

UNITED STATES PATENT OFFICE 2,502,799

REVERSING GEAR

Arthur T. Nabstedt, Hamden, and John O. Berndtson, Short Beach, Conn., assignors to The Snow-Nabstedt Gear Corporation, New Haven, Conn., a corporation of Connecticut Application March 15, 1947, Serial No. 734,974

2 Claims. (Cl. 74—792)

This invention relates to reversing gears, and especially to those for use in connection with marine engines, although the invention is not limited in that respect.

One of the objects is to provide a reversing gear which in comparison to prior devices of this class takes up less linear space in the boat and is lighter in weight in comparison to the power transmitted.

Another object is to provide a device of this kind in which the structure is of maximum simplicity and has maximum accessibility of the parts most likely to require access.

Another object is to provide a reversing gear having improved operating means of the fluid-pressure type, the fluid-pressure medium being either gaseous or liquid.

Another object is to provide a fluid-controlled device of this kind requiring a minimum number of seals acting in connection with a rotary member or members for the purpose of preventing the escape of the controlling fluid, for example air or oil.

A further purpose of the invention is to provide an improved and simple arrangement of fluid-control means for the friction clutch and brake of a reversing gear, and to improve the organization of parts of the reversing gear.

In the accompanying drawings:

Figs. 1 and 2 are views which, taken together, show a reversing gear embodying the invention, in vertical longitudinal section, the parts being in position for forward drive;

Fig. 3 shows, on a larger scale, and in section, certain of the parts illustrated in Fig. 1, the friction clutch, however, being in the disengaged position;

Fig. 4 is a detail plan view of the brake means in connection with the gear set, showing the brake band in the braking position;

Fig. 4A is a fragmentary end view of the band-tightening lever mechanism shown in Fig. 4;

Fig. 5 is a section on line 5—5 of Fig. 1;

Fig. 6 is a detail longitudinal section of the sealing means used in connection with the driving shaft;

Fig. 7 is a diagrammatic view showing the arrangement of the internal gears and pinions of the gear set;

Figs. 8, 9 and 10 are somewhat diagrammatic sectional views showing the operation of the fluid valve illustrated in Fig. 2;

Figure 11:
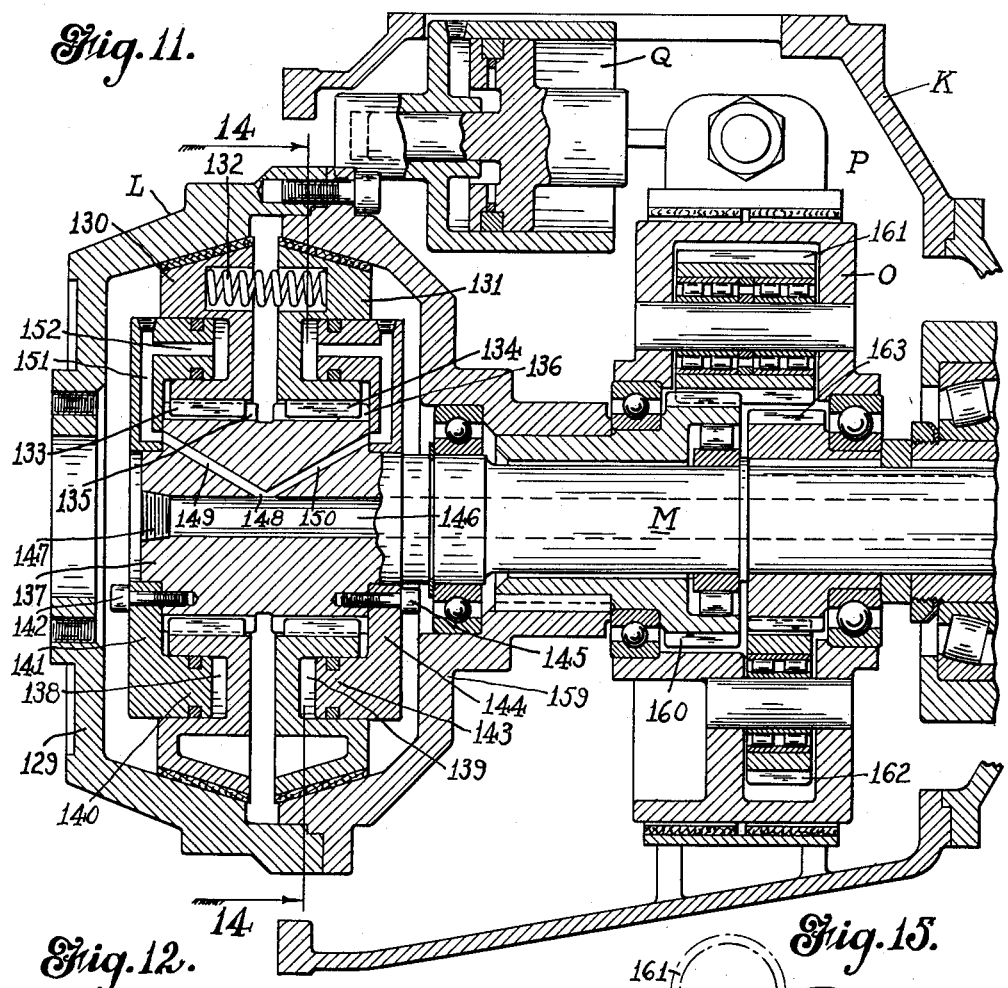
Figure 12:
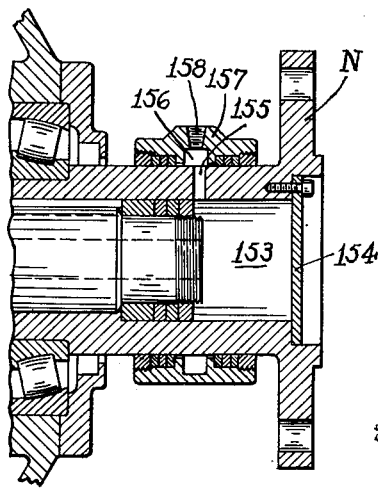
Figure 13:
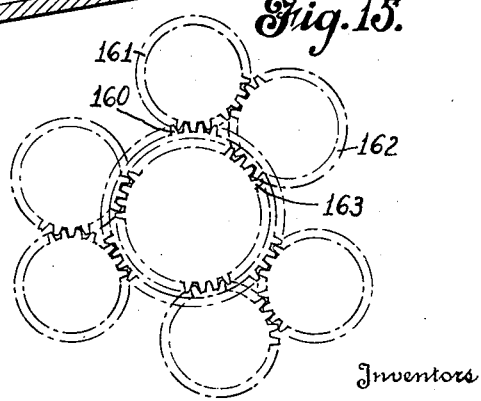
Figure 13:
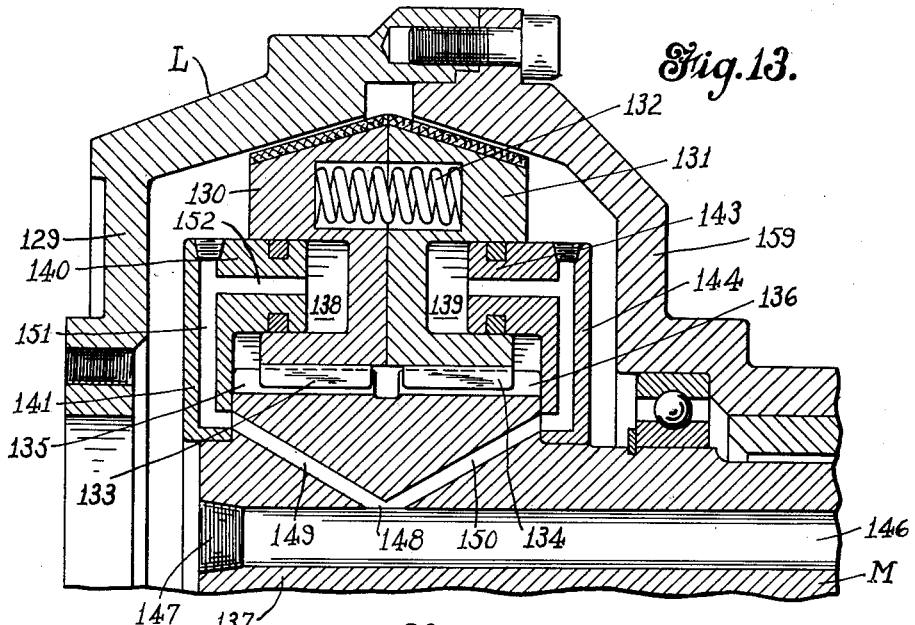
Figure 14:
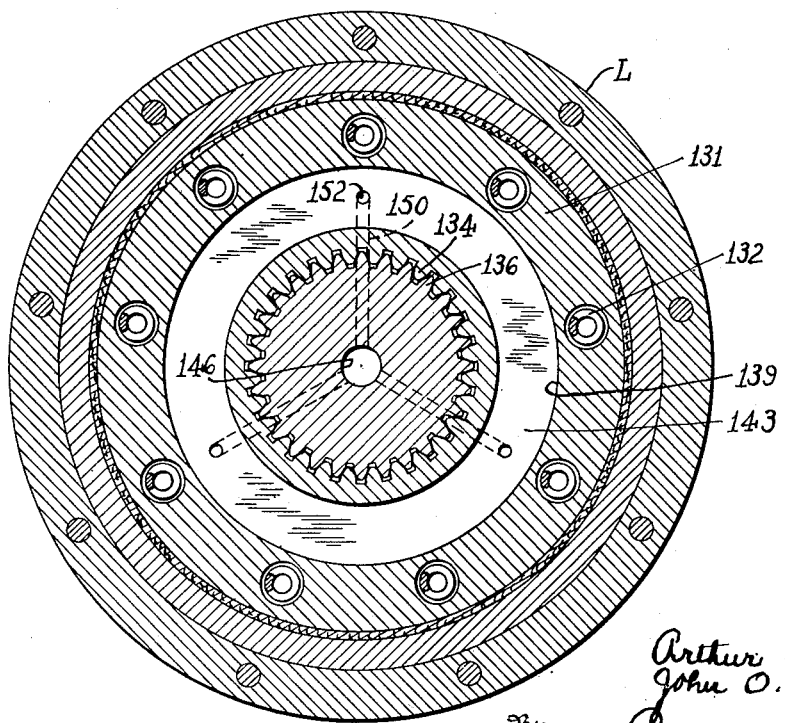

Figs. 11 and 12 together show in vertical longitudinal section a modified form of reversing gear, the clutch being in the engaged position;

Fig. 13 is a sectional view on a larger scale showing certain parts illustrated in Fig. 11, the friction clutch, however, being in the disengaged position;

Fig. 14 is a section on line 14—14 of Fig. 11; and

Fig. 15 is a diagrammatic view of the gears and pinions of the gear set.

The reversing gear shown in Figs. 1 and 2 comprises a housing, the left-hand end of which is intended to be mounted adjacent the flywheel end of a marine engine, and within the housing is a reversing gear having in the end portion adjacent the marine engine a friction clutch having an outer member constantly rotated from the engine shaft, said friction clutch being concentric with a driving shaft extending centrally and longitudinally of the housing, the housing having in its right-hand or rear end portion a stub shaft driven from the driving shaft through reduction gearing and carrying outside of the housing a coupling for a propeller or other power take-off. Within the housing and in close proximity to the friction clutch is a gear set having an external drum or member and associated brake band, the gear set being concentric with the driving shaft. The friction clutch is actuated in one direction by a fluid-pressure device, which in this instance is located radially inwardly of the friction clutch, and the brake band has associated therewith a tightening device adapted to be actuated by a fluid-pressure device. In the case illustrated the friction clutch is normally held in the engaged position for providing forward drive, by a number of springs employed in the clutch structure, and the brake band in connection with the gear set is normally in a released position. A distributing valve connected with the above-mentioned fluid-pressure devices and with a suitable source of pressure fluid can have one of its members readily shifted by hand to a position in which the friction clutch will be moved by the pressure medium to the disengaged position, for placing the reversing gear in neutral; and when desired the movable member of the controlling valve can be shifted to cause tightening of the brake band so that the driving shaft can be caused to rotate in the reverse direction.

In the drawings, the housing is shown at A, the central driving shaft at B, the offset driven shaft having the power take-off, at C, the reduction gearing between the two shafts at D, the friction clutch at E, the gear set at F, and the brake band device associated with the gear set at G. The fluid-pressure device, which in this instance acts to release the friction clutch, is indicated generally at H, the same having a fluid-supply conduit within the shaft B, as hereinafter described, and being controlled by manipulation of an external controlling valve I in the connections to the fluid-pressure source. The fluid-pressure device for tightening the brake band is indicated generally at J, and this has operating connections with the valve I, as hereinafter described.

The driving shaft B has a suitable bearing 20 within the rear end portion of the housing A, and at its forward portion this shaft is supported from the engine with which the reversing gear is associated. The housing has a forward wall 21 placed adjacent the flywheel of the engine, a portion of which flywheel is indicated at 22, and the flywheel is suitably attached, as by means of fastening members 23, to a rotating disk or web 24. This disk or web has a portion located forwardly of the wall 21, and a portion 25 disposed within an aperture 26 in wall 21, and a further portion 27 in the shape of a hub into which the forward end of shaft B is extended. The hub-like portion 27 is hollow and provided with a transverse wall or partition 28 that provides a cup-shaped recess accommodating an anti-friction bearing 29, the outer race of which engages the portion 27 and the inner race of which is engaged with the forward extremity of shaft B.

The driving disk or web 24 is arranged to rotate the outer member of the friction clutch E, which outer member is disposed within the forward end portion of the housing and is a round interiorly chambered member enclosing the inner member of the clutch and enclosing the fluid-pressure device H, and having a forward wall attached to the disk 24, and a rear wall or web rotatably supported with respect to shaft B and operatively connected with a member of the gear set F, as hereinafter described. The forward wall of this outer clutch member is indicated at 30, and this wall is provided at the forward end with a flange 31 suitably connected as by means of the fastening bolts 32 to the portion 25 of the disk member 24. The rear wall or web of the outer clutch member is indicated at 33, this wall being made as a separate piece and secured to wall 30 by suitable means such as fastening bolts 34. From the flange 31 the wall 30 slopes radially outwardly and rearwardly, as shown in Fig. 1, its rear peripheral portion being connected by the bolts 34 to the forward peripheral portion of the wall or web 33. These walls in conjunction provide a hollow member having oppositely inclined friction surfaces 35, 36 cooperating with separate parts 37, 38 of the inner clutch member, the parts 37 and 38 having oppositely inclined outer cone surfaces 39 and 40 provided with suitable facing material and adapted to engage with the inner cone surfaces of the outer clutch member. The inner clutch parts are acted upon by helical springs 41 placed between them and received in suitable sockets 42, said springs tending to separate the inner clutch parts and to hold them in firm engagement with the friction surfaces of the outer clutch member. The clutch parts 37, 38 are ring-like parts that are preferably chambered interiorly for cooling purposes. These parts have their friction surfaces disposed to provide between them an angle which is relatively large or obtuse. These parts are mounted from the shaft B, as hereinafter described, in a manner to be freely slidable in an axial direction with respect to each other and the shaft within certain limits, the arrangement being such that when it is desired to release the clutch the fluid-pressure device H can be brought into action for moving these parts or elements toward each other. For mounting them the shaft B is made in two sections, there being a short forward section 43 attached to the main section 44 by means such as bolts 45, said sections 43 and 44 providing between them an annular seat receiving a ring-like member 46 which serves to guide the parts 37 and 38 in their axial movements. As will be seen from Fig. 3, the forward end of shaft section 44 is provided with a flange 47, and the rear end of section 43 with a flange 48, the flanges being interconnected by the bolts 45, and said flanges providing in conjunction a recess 49 receiving a flange 50 formed upon the ring member 46. The flange 50 is held in this recess by means such as bolts 51. The flange 50 projects radially inwardly from the rear end of the ring member 46. The radially outer surface of ring member 46 is provided with a plurality of splines 52 engaged with corresponding splines 53 and 54 formed upon the radially inner faces of the inner clutch members.

The fluid-pressure device H is constructed and arranged in such a manner that, when the pressure medium is introduced into a pressure chamber provided between two axially movable pressure members or pistons of the device, the rear movable clutch element 38 will be moved in a forward direction, and the forwardly located element 37 moved in a rearward direction, for the purpose of releasing the clutch. With this in view, the construction and arrangement of the fluid-pressure device are preferably as follows: Sufficient space is left between the anti-friction bearing 29 and the flange at the rear end of the forward shaft section to accommodate oppositely moving pressure members 55 and 56 disposed about the forward shaft section, and having packing devices or seals contacting said section at its periphery. The main shaft section 44 is provided with an axial supply passage 57 in communication with a short axial supply passage 58 in section 43, and near the forward closed end of passage 58 lateral passages 59 lead to the exterior of the shaft structure and into an annular fluid-pressure space 60 between the members 55 and 56. The pressure member 55 has a forwardly directed inner sleeve portion 61 provided with suitable packing material 62 held in contact with the shaft surface. The member 55 has a transverse wall portion provided interiorly with packing 63 held in place by a plate or plates 64 and screws 65. The packing 63 has a free edge engaged with a cylindrical surface 66 provided upon a cylindrical wall portion 67 of the pressure member 56. The pressure member 56 is provided at its radially inner part with a sleeve portion 68 extending forwardly therefrom and provided with packing material 68ª, and the member 56 has a transverse wall parallel to the transverse wall of member 55, the first-mentioned transverse wall being integral with the cylindrical wall portion 66. The pressure member 55 is also provided with an outer cylindrical wall portion, the same being indicated at 69, and the same extending in a forward direction from the pressure member so as to be within and in contact with the cylindrical wall portion of the other pressure member, the arrangement being such that the pressure members telescope, with a pressure chamber provided therebetween, and with the packing preventing any escape of fluid between the radially outward portions of the members where they make contact with each other, and each pressure member being free to slide axially with respect to the other pressure member.

The members 55 and 56 are provided at their forward ends with flanges 70 and 71, respectively, disposed in transverse planes, the flange 71 being disposed forwardly of the clutch section 37 and being adapted to make contact with said section at the radially inward part of the latter. The cylindrical wall portion of member 56 is disposed immediately inwardly of the splined member 46, previously described, said splined member having a smooth inner cylindrical surface which aids in guiding the pressure member 56. While the flange 71 is adapted to shift clutch section 37 in one direction, a shift of clutch section 38 in the opposite direction is effected by a ring member 72 adapted to make contact with section 38 at the radially inner part thereof, ring member 72 being engaged at its rear face by nuts 73 screwed upon the rear ends of rods 74, which rods are freely movable in perforations 75 provided in ring member 72. The rods 74 are located in a number of circumferential locations with respect to the pressure member 55, and pass through perforations 76 in the flange 70, and nuts 77 are screwed on the rods forwardly of the flange 70. The rods 74 also pass through perforations 78 in the flange 71 and through suitable bores 79 provided in the splined member 46.

The gear set F, previously mentioned, is placed around the shaft B in a location immediately at the rear of the web member 33, previously described. In this particular case the gear set has driving and driven internal gears, being similar to one of the gear sets shown in Nabstedt Patent No. 2,286,223, of June 16, 1942. This gear set has a driving gear 80 and a driven gear 81, the structure including a pinion cage having an external drum 82 surrounded by the brake band G and having end walls between which are mounted long and short pinions arranged to intermesh, and meshing with the respective internal gears, as disclosed in the above-mentioned patent. The driving internal gear 80 is directly connected to the web 33 in a suitable manner, as by the bolts 83, the connection being in a region intermediate the inner and outer edges or boundaries of the web, and a shouldered portion on the web being directly engaged with the internal gear. The driven internal gear 81 is rigidly connected by a flanged hub member 84 with the shaft B, said hub being keyed to the shaft, as shown at 85, and the rearmost anti-friction bearing 86 of the gear set being supported upon a portion of the hub. The forward anti-friction bearing 87 of the gear set is engaged with a cylindrical portion of shaft B, and immediately forward of anti-friction bearing 87 a similar anti-friction bearing 88 is provided upon this portion of the shaft in a manner to support the inner edge of the web 33.

The brake mechanism G comprises a resilient band 89 lined with suitable friction material and embracing the drum 82 of the pinion cage and having in association with its proximate ends a tightening mechanism that involves a lever mechanism actuated by the fluid-pressure device J, the fluid-pressure device being operably connected with the controlling valve I. In this particular embodiment the fluid-pressure device J is mounted within the housing at the upper part of the latter, and is adapted to apply the brake, when brake application is desired, by imparting a push to the brake-tightening lever mechanism, for which purpose the pressure device is located rearwardly of the brake band, and the lever mechanism suitably constructed for the intended purpose. The fluid-pressure device comprises a fluid-pressure cylinder 90, arranged longitudinally with respect to the housing and containing a piston 91 provided with suitable packing material 92. One side of the cylinder is exposed at the exterior of the housing, and this side is provided with an inlet passage 93 leading into the cylinder, said inlet passage being connected with the valve I by means such as a flexible tube 94. The piston 91 is prevented from canting in the cylinder by the provision of a rearwardly disposed shank 95 on the piston, which shank slides in a socketed portion 96 provided upon the rear wall of the cylinder. The piston is also provided with a forwardly projecting cylindrical portion 97, the forward face of which is adapted to make contact with the above-mentioned lever mechanism for the purpose of applying the brake. The lever arrangement for tightening the band is generally of the type disclosed in the Nabstedt Patent No. 2,370,484, of February 27, 1945, the brake band itself being resiliently supported in the manner shown in Fig. 3 of that patent, and having outwardly extending members projecting from the proximate ends of the band and connected to two controlling levers, one of which is shifted pivotally for the purpose of exerting a thrusting or camming effect upon the other to thereby tighten the band against the action of a spring having a tendency to hold the band ends in releasing position. In the present instance, however, the tightening action is secured by a push upon the main tightening lever, and, furthermore, the arrangement is such that the pressure device cannot force the lever mechanism beyond a dead-center position, and cannot, therefore, lock the brake. In the present instance one end of the band is provided with an upstanding lug 98 and the other with a post 99, lug 98 having a clearance hole receiving the threaded pin 100 which is provided at the outer side of the lug with the nut 101. The primary band-tightening lever is shown at 102, and this lever has one end pivoted at 103 in a kerf provided in the inner end of the pin 100. At its opposite end the lever 102 is pivoted at 104 to a duplex secondary lever 105. The pivot 104 is at one end of a lever 105, and at the opposite end this lever has a swivel connection upon the post 99, as shown in Nabstedt Patent No. 2,370,484. Upon the top of the post 99 is a swiveling block 106 having a clearance opening therein in which slides a stem 107 that is connected to a projection 108 provided at the upper end of the member which pivotally connects lever 102 with pin 100. Between projection 108 and block 106 a coil spring 109 embraces the stem 107.

Fig. 4 shows the piston of the device J projected forwardly to the maximum extent, and it will be noted that in this position the piston has shifted lever 102 to an extent sufficient to give full application of the brake, but that the pivot pin 104 has not yet reached a dead-center position. In the form shown, this position could not be reached because of the fact that the lever 105 has a curved forward edge portion 110 which abuts the post 99 so as to prevent further swing of the lever. The extension on the piston actuates the lever 102 by engaging a rounded projecting portion 111 thereof, said rounded portion engaging the planar face of the piston extension, and the portion 111 being located laterally of the pivot 104.

In order to hold the brake band 89 in position while the fluid-pressure device is exerting thrust upon the lever mechanism, the adjacent end of the band is secured against dislocation, for example by having the post 99 extended upwardly into an aperture in a fixed plate 99a, carried by the housing. In some cases the same result could be accomplished by securing the pressure device rigidly to the brake band.

The passage or duct 57 in the shaft B leads to the rear end of the shaft, and adjacent the rear end of the shaft is a sealing device, generally indicated at 112, that is connected to the valve I by a flexible tube 113. The sealing device 112 is located within a removable cover 114 applied to the rear wall of the housing. The sealing device may comprise a cylindrical casing 115 that is stationarily supported and receives internally a tubular member 116 extending rigidly from the end of the shaft B and in communication with the passage 57. In the form shown, the tubular member 116 is rigidly held in position with respect to the shaft by means of a threaded bushing 117 screwed into a socket in the end of the shaft. The tubular member 116 has an enlargement or head 118 whose periphery rotates in engagement with the inner surface of the casing 115. The left-hand end (Fig. 6) of the casing is equipped with a closing plug 119 provided with suitable packing 120, and anti-friction bearings 121, 122 are held in place between the head 118 and the bushing 117. Between the head 118 and the right-hand end of the casing (Fig. 6) a spring 123 is interposed. It will be noted that the arrangement is such that, as the shaft rotates, the tubular shaft extension rotates in the sealing device in a manner to prevent leakage of fluid, while at the same time communication is maintained between the stationary tube or pipe 113 and the passage in the shaft.

The controlling valve I can be of any preferred form suitable for the sequential operation of the fluid-pressure devices associated respectively with the friction clutch and the brake. It may be assumed that the pressure fluid is a liquid such as oil, and the drawings illustrate somewhat diagrammatically a controlling valve adapted to handle a pressure liquid. This valve has a round casing 124 enclosing a rotary valve body 125 adapted to be turned by a suitable handle 126. The casing is connected at one point in its circumference to an inlet pipe 127 leading to a source of liquid under pressure, and at other points in its periphery the casing is connected with the flexible tubes 94 and 113, previously mentioned, and to an exhaust tube or pipe 128. By turning the valve body to the three different positions shown in Figs. 8, 9 and 10, the required connections can be made for placing the reversing gear in position for forward drive, neutral, and reverse, respectively, as indicated in those views.

With respect to the manner of operating the device, it will be noted that in Fig. 1 the position for forward drive is shown. Here the separate axially movable clutch sections, under the influence of their associated springs, are maintained in engagement with the outer member of the friction clutch, and the outer clutch member is driven by the engine and transmits rotation to the shaft B through the splined connections of the clutch sections with the hub structure at the forward end of the shaft. The outer clutch member carries with it, through its connection with the internal gear 80, the rotatable parts of the gear set, including the gear set drum, which rotates freely within the brake band. Under these conditions, with the gear set parts revolving as mentioned, the gear set has an action similar to that of a flywheel. The pressure device H, under these conditions, has the position shown in Fig. 1, the parts when in this position revolving with the shaft B, which is non-rotatively connected with the axially movable pressure members of the device H through the connections previously described, including the tie rods or tie bolts passing through these members and through the radially outward part of the hub-like structure upon which the axially movable clutch members are mounted. The pressure device J under these conditions has the position shown in Fig. 1. The valve I, being in the position of Fig. 8, the fluid-supply connections from the valve to the clutch and to the brake device are in communication with the exhaust, and the inlet through the pipe 127 connected to the fluid-pressure source is closed off by the body of the valve.

For placing the reversing gear in the neutral position, it is necessary to admit pressure to the pressure device H without admitting it to the device J. This is achieved by turning the valve to the position shown in Fig. 9, where the inlet from the pressure source is connected to the device H, the device J, on the other hand, being connected to the exhaust. When pressure is admitted to the device H, the inner conical clutch members are brought toward each other by the forward movement of the rear cone section and rearward movement of the front or forward cone section. Fig. 3 shows the positions to which the cone members are moved for disengagement. In the form illustrated, the releasing movement of the cone sections is limited by their coming into contact with each other at their adjacent surfaces, as shown in Fig. 3; but in some cases the movement can be limited by other means. The opposite movement of the cone sections from the engaged position to the disengaged position is caused by the movement of the pressure members 55 and 56 when the pressure fluid is introduced into the annular space between these members. Referring to Fig. 3, member 55 is thrust to the left by the incoming pressure, and movement is transmitted from member 55 to ring 72 for moving the rear cone section in the same direction. The incoming pressure causes movement of the member 56 to the right, thereby causing movement of the cone section 37 in the same direction through the action of the flange 71. When this declutching movement has been effected, the reversing gear is in the neutral position. In the neutral position there is no drive of the driven shaft from the forward end, as previously described, and the outer clutch member rotates without imparting rotation to the shaft, and the propeller is held by the surrounding water while the pinions of the gear cage have rotational and planetary movement.

To shift to reverse, the controlling valve has its body member moved to the position shown in Fig. 10. The result is to connect the fluid source with the pressure devices H and J, cutting off the exhaust connection. The effect of this in shifting from the neutral position is to continue the disengagement of the clutch by maintaining the connection to the device H, and to connect the brake-applying pressure device so that the brake will be moved to the tightened position shown in Fig. 4. This causes the pinion cage of the gear set to be held stationary, and the drive is then reversed because the clutch is out of engagement, the pinion cage is held stationary, and the internal gear 81 driven in the reverse direction as a result of the pinions rotating about fixed axes, the internal gear 81 being driven oppositely from the internal gear 80.

A double-cone clutch has marked advantages when used in connection with a reverse gear, and the double-cone clutch herein disclosed, in which the inner axially movable members of the clutch are splined to a large spline ring, permits a pressure cylinder or chamber of sufficient area to be arranged radially inwardly with reference to the cone clutch members. The chamber or cylinder is provided between oppositely moving annular pressure members surrounding the shaft, a portion of the shaft acting as a support or bearing for the pressure device. The single fluid cylinder or chamber, which is expandable forwardly and rearwardly, is easily controlled as far as leakage of the fluid is concerned, because only two relatively small seals are necessary, one seal being associated with each movable pressure piston or member.

There is a certain advantage in having the friction clutch actuated by springs to the engaged position, in that, should the fluid-pressure supply be reduced or fail altogether, the clutch would be engaged to carry the full power of the engine, and the boat would come into port. However, it is within the contemplation of the invention to have the friction clutch engaged by fluid pressure and disengaged by springs. It is also to be noted that, owing to the fact that the brake-tightening leverage cannot be moved to a center position or an over-center position, the brake cannot be tightened to a degree where there is any danger of its being locked against release. It is, however, contemplated by the invention that the pressure device in association with the brake band may be used for releasing a band that is tightened by a spring or the like.

One of the marked advantages of the invention is that the reversing gear structure and organization are of maximum simplicity and compactness. Revolving actuating parts are reduced to a minimum. This applies to the fluid pressure device associated with the friction clutch, and in this connection it is also to be noted that it is unnecessary to employ a shifter lever or the like in connection with the mechanism. Such levers take up valuable space, and, being unnecessary in accordance with the present invention, the gear set can be very close to the friction clutch, thereby reducing to a considerable degree the over-all length of the device, and permitting a lighter reversing gear to be provided without any sacrifice of strength. Another marked advantage arises from the fact that the controlling device for controlling the operation of the reversing gear is of simple nature and can be manipulated with the utmost ease.

The form of reversing gear above described and illustrated in the drawings is one intended for splash lubrication, but the organization of the parts is such as to lend itself to pressure lubrication, and it is understood that the arrangement shown for driving the outer member of the friction clutch is by way of example only.

Another advantage of the described structure is that the seal used in connection with the introduction of the pressure medium into the driving shaft is located at or near the rear end of the device, where it is readily accessible.

In the modified form of reversing gear shown in Figs. 11 to 15, inclusive, the friction clutch is actuated by a fluid-pressure medium, but the clutch is of different structure from that first described. The gear set is also of a different character, although its brake-band mechanism and associated pressure device are similar to those above described. In this instance there is no reduction gearing provided, and the fluid-pressure inlet to the clutch has a modified arrangement. In this form the fluid-pressure device for shifting the clutch members comprises two pressure chambers into which the pressure medium is introduced, one of these chambers being in one of the movable clutch members and the other being in the other movable clutch member. The movable clutch members adapted to be moved toward and away from each other have a splined connection with the drive shaft as before, but the detailed structure is substantially different from that first described.

In this form, the housing K has a friction clutch L projecting forwardly from it to a considerable extent, and the friction clutch is adapted to drive a central shaft M having a propeller coupling N applied to the rear end thereof. Concentric with the shaft is a gear set O. This gear set has a pinion cage surrounded by a brake band P. The brake band P can be of the structure previously described, and it has associated with it a fluid-pressure device Q, which it may be assumed is of the same structure as the device J, except for the fact that the device Q is located forwardly of the gear set in a space between the gear set and the clutch, and except for the fact that the tightening mechanism of the band is arranged to conform to the different location of the pressure device.

In this form of device, the clutch has an outer member, generally similar to that in the form first described, said outer member having at the forward portion thereof a substantially vertical wall 129, to which a driving disk or coupling (not shown) can be attached by suitable fastenings. The clutch has oppositely movable inner members or sections 130 and 131 acted upon by springs 132 which normally hold them in the separated engaged position. Each member or section is of annular form, and the respective sections have splines 133 and 134 engaging longitudinal splines 135 and 136, which in this case are formed directly upon the periphery of an enlarged portion or hub 137 of the shaft. The sections are provided with annular grooves or recesses 138 and 139, facing, respectively, forwardly and rearwardly, and these recessed portions of the sections, in connection with fixed parts carried by the shaft and projecting into the recesses, are adapted to provide expansible fluid chambers. Projecting into the recess 138 is an annular piston-like portion 140 projecting from a member 141 in the nature of a disk fixed to the forward end of the shaft by means such as bolts 142. The part 140 is provided with suitable packing, as shown. The disk-like body portion of the member 141 is located forwardly of the splines of section 130. The recess in section 131 is engaged by the projecting portion 143 of a disk-like member 144 held in fixed position on the shaft by means such as bolts 145.

The shaft is provided with a longitudinal interior passage 146 closed off at the forward end of the shaft by a plug 147, and provided intermediate of the ends of the hub portion 137 with a port 148 communicating, by way of slanting bores 149, 150 in the hub, with internal passages in the members 141 and 144. Inasmuch as these internal passages of the two members are identical, a description of one will suffice. Each of the members has a radial passage 151 communicating by a short branch with the corresponding passage 149 or 150. Intermediate the ends of the passage 151 a central longitudinal passage 152 leads through the piston-like part to the end face of the piston, so as to enable fluid to reach the chamber in the clutch section. When fluid is admitted to the recesses or chambers, the inner members of the clutch are moved from the engaged position, shown in Fig. 11, to the disengaged position, shown in Fig. 13, against the action of the springs 132. In this movement each of the clutch sections moves and is guided upon the fixed annular piston-like portion rigid with the shaft. The fluid acts directly against a transverse wall provided upon the clutch section, in a manner to force the clutch section forwardly or rearwardly as the case may be.

The passage 146 in the shaft extends to the rear extremity of the shaft, as shown in Fig. 12, and the shaft extremity, which projects rearwardly from the housing, has applied to it externally the coupling member N. This coupling member extends rearwardly beyond the end of the shaft to provide a chamber 153 in the coupling, which is closed at the rear of the coupling by means such as a plate 154. The fluid for actuating the pressure device is introduced laterally into the chamber 153 by way of a port 155, which port is in communication with a groove 156 in a relatively fixed sealing ring 157 having an inlet port 158 to which a suitable supply pipe or tube (not shown) is connected. Suitable sealing material is interposed between the fixed ring 157 and the rotating coupling member. Suitable sealing means are also provided between the wall of the coupling member and the side of the shaft, as shown in Fig. 12, to prevent leakage of fluid in a forward direction.

The outer member of the clutch is provided at its rear portion with a web 159 that is keyed to a sun gear 160 that is disposed within the pinion cage of the gear set O. This sun gear turns freely around the shaft M. The pinion cage is in the form of of a drum carrying shafts for long pinions 161 that mesh with the sun gear and with short pinions 162, the pinions 162 in turn meshing with a sun gear 163 that is keyed to the shaft.

The method of operating the reversing gear is substantially the same as in the form first described.

The forms of the gear herein shown are by way of example only, and it is understood that many different modifications and detail changes may be made without departing from the principles of the invention or the scope of the claims.

We do not claim herein the disclosed improvements in friction clutches, as these are claimed in our application, Serial No. 734,973, filed of even date.

It will be apparent that in both forms of the invention herein described, the outer number of the clutch, which is driven by the engine, is shaped generally has a hollow cup-shaped body having a forward wall for connection to a driving member and having a rear wall in the nature of a web, the peripheral part of the cup, that is to say, its portion of maximum diameter, being provided internally with fixed oppositely inclined friction surfaces that are adapted to be contacted by the respective sections of an inner clutch member. The sections are separated from each other axially of the clutch for the purpose of engaging the outer clutch member, and are moved toward each other for the purpose of declutching. These sections are adapted to be moved oppositely through a fluid-pressure device associated with them and with a portion of the shaft that is rotated by the friction clutch when the latter is in the operative position.

What we claim is:

1. A reversing mechanism having a driving shaft, an engine-driven member freely rotatable with respect to said shaft adjacent the forward end of the shaft, a friction-clutch means for clutching said engine-driven member to the shaft, a fluid-pressure device adjacent said friction-clutch means for actuating the latter, and means including a gear set and an associated brake means concentric with the shaft rearwardly of said friction-clutch means for imparting reverse rotation to the shaft when the friction-clutch means is disengaged, said gear set having driving and driven internal gears of which the driving internal gear is immediately contiguous to the engine-driven member, the engine-driven member having a transverse wall or web to which said driving internal gear is directly connected.

2. In a reversing mechanism, the combination of a longitudinal shaft having a front end and a rear end and having the rear end arranged to drive a propeller or the like, an engine-driven member rotatively mounted adjacent the front end of the shaft, means for clutching said engine-driven member to the front end of the shaft for imparting forward drive, said clutching means being disposed within said engine-driven member and the latter having a tranverse web enclosing said clutching means, and means including driving and driven internal gears of which the first is immediately contiguous to the engine-driven member and directly connected to said web for imparting reverse rotation to said shaft.

ARTHUR T. NABSTEDT.
JOHN O. BERNDTSON.

REFERENCES CITED

The following references are of record in the file of this patent:

UNITED STATES PATENTS

| Number | Name | Date |
|---|---|---|
| 1,653,262 | Dickson | Dec. 20, 1927 |
| 2,023,597 | Klocke et al. | Dec. 10, 1935 |
| 2,286,223 | Nabstedt | June 16, 1942 |
| 2,370,484 | Nabstedt | Feb. 27, 1945 |
| 2,422,159 | Wood | June 10, 1947 |